United States Patent [19]

Inoue

[11] 4,387,286
[45] Jun. 7, 1983

[54] APPARATUS FOR CONTROLLING SPLASHES AND PURIFICATION OF A MACHINING LIQUID

[75] Inventor: Kiyoshi Inoue, Tokyo, Japan

[73] Assignee: Inoue-Japax Research Incorporated, Yokohama, Japan

[21] Appl. No.: 245,596

[22] Filed: Mar. 19, 1981

[30] Foreign Application Priority Data

Mar. 26, 1980 [JP] Japan .............................. 55-38835[U]
Mar. 26, 1980 [JP] Japan .............................. 55-38836[U]
Apr. 2, 1980 [JP] Japan .............................. 55-43191[U]

[51] Int. Cl.³ .................... B23K 9/16; B01D 35/06; B03C 1/30
[52] U.S. Cl. ................. 219/69 D; 210/222; 210/695; 219/69 W
[58] Field of Search ............... 219/69 D, 69 W, 69 R, 219/69 M; 210/695, 222

[56] References Cited

U.S. PATENT DOCUMENTS

3,463,729 8/1969 Bean ................................. 210/695
3,477,948 11/1969 Inoue ................................ 210/695
3,928,163 12/1975 Ullmann ........................ 219/69 W Primary Examiner—B. A. Reynolds
Assistant Examiner—Teresa Walberg
Attorney, Agent, or Firm—Karl F. Ross; Herbert Dubno

[57] ABSTRACT

An arrangement for use with a worktank or machining receptacle in a machine tool, e.g. a wire-cut EDM machine, wherein a machining liquid is supplied to a machining zone defined between a tool and a workpiece wherefrom it is permitted to fall at least in part freely by gravity while entraining the machining products therein. In the receptacle provided for temporarily impounding therein the machining liquid falling directly from the machining zone there is provided a liquid damping member which includes a rugged layer of magnetic material for impingement upon by the falling machining liquid droplets and streams to whereby dissipate splashes thereof while magnetically trapping the ferromagnetic machining products therein.

42 Claims, 19 Drawing Figures

APPARATUS FOR CONTROLLING SPLASHES AND PURIFICATION OF A MACHINING LIQUID

FIELD OF THE INVENTION

The present invention relates to machine tools, e.g. EDM (electrical discharge machining) machines, ECM (electrochemical machining) machines and ECG (electrochemical grinding) machines as well as conventional mechanical machine tools. More particularly, the invention relates to a solution of certain problems which arise vis-a-vis a machining fluid leaving a machining zone in a machine tool.

BACKGROUND OF THE INVENTION

In machine tools, a machining liquid, e.g. a cutting fluid, is commonly supplied to a machining zone defined between a tool and a workpiece. Machining products formed in the machine zone are entrained in the flushing liquid which is then permitted to fall by gravity for collection. For example, in a wire-cut EDM machine, the tool is constituted as a stretch of continuous wire electrode which is axially transported to traverse a workpiece while defining a cutting gap therewith. A dielectric liquid, typically distilled or deionized water, is supplied to the gap while a machining current is passed through the gap between the traveling wire electrode and the workpiece to electroerosively remove material from the latter. The machining liquid flushing the cutting zone disposed in or above a worktank or machining receptacle carries chips, tar, sludge and other gap products and is permitted to fall to the floor of the worktank or machining receptacle for temporary collection or impounding therein and subsequent removal to a reservoir. The machining liquid moving in droplets or a stream from the machining zone strikes the floor and then scatters. Splashes thus caused may hit surrounding machine and equipment parts to contaminate them and even produce rusting or corrosion thereon. Furthermore, these splashes which may contain tars, chips and/or sludges are generally detrimental to the operator's health.

OBJECTS OF THE INVENTION

It is accordingly an important object of the present invention to provide a new and useful arrangement in a machine tool which effectively solves the foregoing problems.

A specific object of the invention is to provide means for use in conjunction with a customary worktank or machining receptacle for temporarily impounding a machining liquid from the machining zone, which means practically eliminates harmful machining liquid splashes while effectively trapping harmful machining products.

A further object of the invention is to provide means described whereby the useful life of a filter arrangement required downstream of the worktank or machining receptacle for recycling the machining liquid is substantially increased.

Further objects of the invention will become apparent as the following description proceeds.

SUMMARY OF THE INVENTION

The invention is directed to an arrangement in or for use with a machine tool wherein a machining liquid is supplied to a machining zone defined between a tool and a workpiece and thence allowed to fall at least in part by gravity while entraining ferromagnetic machining products therein, which arrangement comprises: a receptacle for temporarily impounding therein the machining liquid falling directly from the machining zone; and a liquid collecting member comprising a rugged layer of magnetic material disposed below the machining zone in the receptacle for impingement upon by the falling machining liquid to dissipate or decay splashes thereof while capturing the ferromagnetic machining products therein.

Specifically, the rugged layer may comprise at least one layer of particulate objects of magnetic material which is retained substantially snugly in a casing open to the machining zone. The casing has in its side wall portion at least one opening for allowing the machining liquid collected in the casing to flow to the floor of the receptacle. Moreover, the casing has in its bottom wall portion at least one opening for allowing the machining liquid collected in the casing to flow to the floor of the receptacle. The casing may comprise a screen of mesh smaller than the particulate objects for defining its bottom portion and a frame member for constituting its side wall portion. The particulate objects may either entirely or in part be composed of a permanent magnet material, e.g. an aluminum-nickel-cobalt alloy, barium ferrite, strontium ferrite, samarium cobalt, a manganese-aluminum alloy or an iron-chromium-cobalt alloy. When a portion of the particulate objects are composed of such a permanent magnet material, the remainder thereof should preferably be composed of a magnetizable material, e.g. iron, an iron-chromium-cobalt alloy, an iron-silicon-aluminum alloy or an iron-nickel alloy, should be adapted to be magnetized by the magnetic fluxes produced at least in part by the permanent magnet particulate objects. When the entire portion of the particulate objects are composed of such a magnetizable material, external magnetic field means should be provided, e.g. within the casing, for magnetizing the magnetizable particulate objects. The external magnetic field means may comprise an electromagnetic coil energizable by an external DC source for exerting a magnetic field on the magnetizable particulate objects. The external magnetic field means may alternatively comprise an external permanent magnet for exerting a magnetic field on the magnetizable particulate objects. The particulate objects have a particle size, preferably, between 2 and 10 mm and may be spherical in shape.

In accordance with another embodiment of the invention, the particulate objects are supported on a support member consisting of an elastic or flexible substance, e.g. rubber or resin. In this case, magnetic particles should be distributed in the elastic or flexible substance for holding the particulate objects by magnetic attraction. The particulate objects may here again be spherical in shape but may alternatively have a conical or pyramidal shape with a base disposed for attachment to the support member. The magnetic particles may either entirely or in part be composed of a permanent magnet material, e.g. an aluminum-nickel-cobalt alloy, barium ferrite, strontium ferrite, samarium cobalt, a manganese-aluminum alloy or an iron-chromium-cobalt alloy. When a portion of the magnetic particles are composed of such a permanent magnet material, the remainder thereof should preferably be composed of a magnetizable material, e.g. iron, an iron-chromium-cobalt alloy, an iron-silicon-aluminum alloy or an iron-nickel alloy, and should be adapted to be magnetizable by the magnetic fluxes produced at least in part by the permanent magnet particulate objects. When the entire portion of the magnetic particles are composed of such a magnetizable material, external magnetic field means should be provided for magnetizing the magnetizable particles. The external magnetic field means may comprise an electromagnetic coil energizable by an external DC source for applying a magnetic field upon the magnetizable particles. The external magnetic field means may alternatively comprise an external permanent magnet for applying a magnetic field upon the magnetizable particles. The magnetic particles may have a particle size between 1 micron and 10 mm and preferably should be smaller than the aforementioned particulate objects of magnetic material.

In accordance with a further embodiment of the invention, the rugged layer of magnetic material is constituted by a multiplicity of projections of a homogeneous body of an elastic or flexible substance having magnetic particles distributed therein. The projections should preferably be greater in size than the magnetic particles. The projections may be spherical, conical or pyramidal in shape. The projections may be inclined outwardly or towards at least a pair of opposed horizontal ends of the body. Here again, the magnetic particles may either entirely or in part be composed of a permanent magnet material. When a portion of the particles are composed of a permanent magnet material, the remainder thereof should preferably be composed of a magnetizable material. When the entire portion of the particles are composed of a magnetizable material, external magnetic field means should here again be provided for magnetizing the magnetizable particles. The projections should be of a width, preferably between 2 and 10 mm and the magnetic particles may be of a particle size ranging between 1 micron and 10 mm.

BRIEF DESCRIPTION OF DRAWING

These and other objects, features and advantages of the present invention will become more readily apparent from the following description taken with reference to the accompanying drawing in which.

SPECIFIC DESCRIPTION

Figure 1:
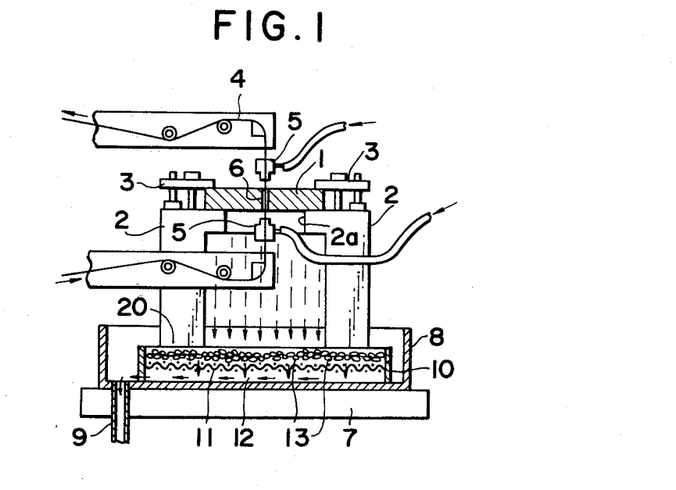
FIG. 1 is a sectional view diagrammatically illustrating a wire-cut EDM arrangement incorporating a first embodiment of the invention.
Figure 8:
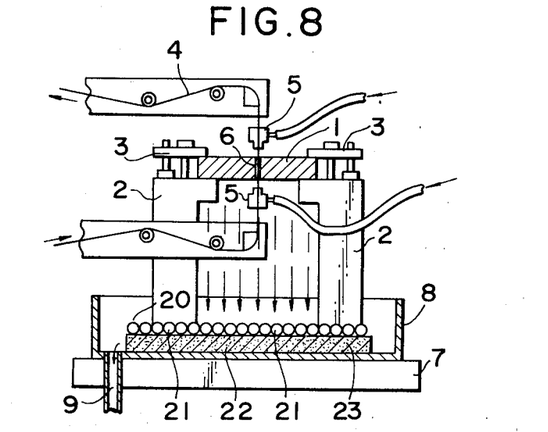
FIG. 8 is a sectional view diagrammatically illustrating a wire-cut EDM arrangement incorporating a second embodiment of the invention.
Figure 13:
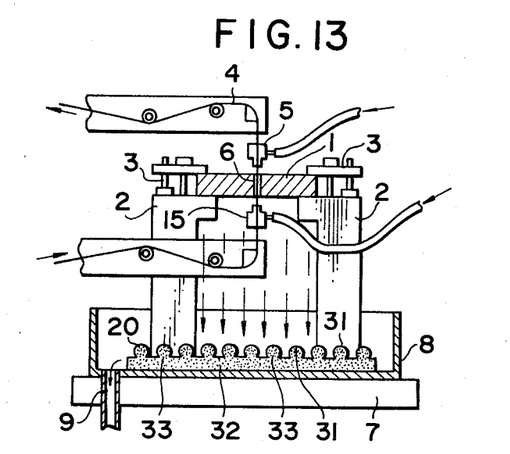
FIG. 13 is a sectional view diagrammatically illustrating a wire-cut EDM arrangement incorporating a third embodiment of the invention.

In the wire-cut EDM arrangement shown in FIGS. 1, 8 and 13, a workpiece 1 is mounted on a work support 2 and secured thereto by means of clamps 3. A wire electrode 4 axially driven continuously from a supply (not shown) to a takeup (not shown) is guided to traverse the workpiece 1 and a top opening 2a of the work support 2. A pair of fluid supply nozzles 5 are arranged to furnish a cutting liquid, which customarily is conveniently distilled water, from the upper and lower sides of the workpiece 1, respectively, to the region of a cutting zone or gap 6 defined between the traveling wire electrode 4 and the workpiece 1 juxtaposed therewith. A worktable 7 adapted to be driven in an X-Y or horizontal plane carries a worktank or machining receptacle 8 in which the work support 2 is held in position. An EDM power supply (not shown) is electrically connected to the wire electrode 4 and the workpiece 1 to produce a succession of electrical discharges through the cutting gap 6 flooded with the cutting liquid to electroerosively remove material from the workpiece 1. Chips, tar, gases and sludges are formed as gap products and carried into the portion of the cutting liquid which directly flushes through the cutting gap 6. The cutting liquid containing these gap contaminants, along with the remaining portion of the supplied cutting liquid which has taken routes around the workpiece 1, is allowed, as the waste liquid to fall towards the floor of the receptacle 8. The function of the receptable 8 is to temporarily impound or collect therein the waste cutting liquid from the cutting zone 6. The receptacle 8 is provided with an outlet 9 through which the collected waste cutting liquid is led to a reservoir (not shown). A fine filtration unit is typically provided at the inlet or outlet side of the reservoir to purify the waste cutting liquid for recycling to the cutting zone. As the table 7 is displaced along a prescribed path, the workpiece 1 carried thereon is displaced relative to the traveling wire electrode 4 positioned in a machining relationship therewith to form therein a desired wire-cut contour of the shape and size defined by the path of displacement of the table 7.

In the embodiment of FIG. 1, the liquid collecting or damping member disposed directly below the cutting zone 6 in the receptacle 8 is constituted by particulate objects retained in a casing 10 open both to the cutting zone 6 or the workpiece 1 and the wire electrode 4 and to the floor of the receptacle 8. The casing 10 is shown having a screen 11 located above a fluid passage 12 and on which the particulate objects of permanent magnet material designated at 13 are snugly supported. These particulate objects, which are preferably of a particle size ranging between 2 and 10 mm and may be composed of a rare-earth magnet material (e.g. samarium cobalt), barium-ferrite, strontium ferrite, a manganese-aluminum alloy, an aluminum-nickel-cobalt (alnico) alloy or an iron-chromium-cobalt alloy, define a rugged solid surface layer for impingement by the waste cutting liquid falling from the cutting zone 6 and cause the impinging droplets and streams of the liquid to irregularly deflect and reflect so as to counteract their kinetic energy. As a result, practically splash-less and laminar flows of the waste cutting liquid are created along the surfaces of the particulate objects 13 and allowed to percolate by gravity through the interstices thereof, through the meshes of the screen 11 and in turn through the passage 12 and eventually to be discharged smoothly through the outlet duct 9 of the receptacle 8. In addition, the machining products entrained in the waste cutting liquid are effectively trapped at the interstices of the particulate objects 13 of permanent magnet material which are densely packed together by virtue of their mutual magnetic attraction. When the workpiece 1 is a ferrous material as is commonly so, the machining chips and sludges are ferromagnetic and hence also magnetically attracted to these particulate objects 13. Since, in this manner, the waste cutting liquid is led smoothly, without causing splashes thereof, to flow in a thin layer on the impinged surfaces, a full protection for the environment against detrimental pollution and contamination is assured. Furthermore, the controlled primary trapping of the machining chips in the machining receptacle 8 is convenient and greatly increases the useful life of the fine filtration unit which must be provided separately in the recycling conduit. After a given machining operation, the casing 10 may be removed from the receptacle 8 and the particulate objects 13 may simply be washed.

Figure 2:
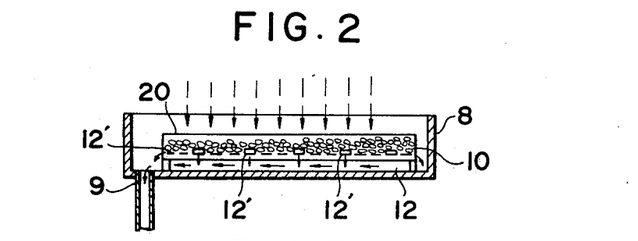
FIGS. 2 through 6 are sectional views diagrammatically illustrating modifications of the first embodiment.
Figure 3:
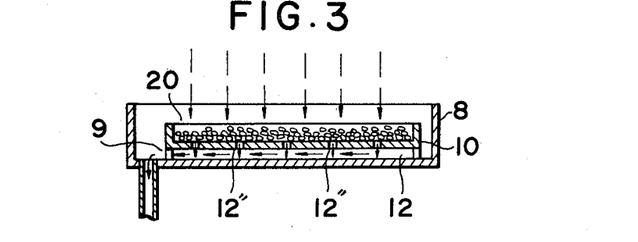
Figure 4:
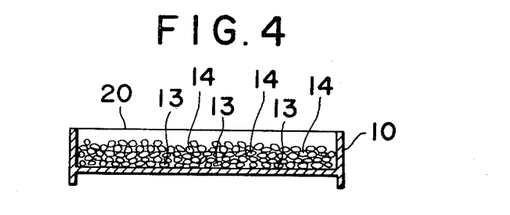
Figure 5:
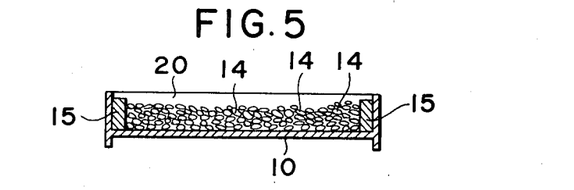
Figure 6:
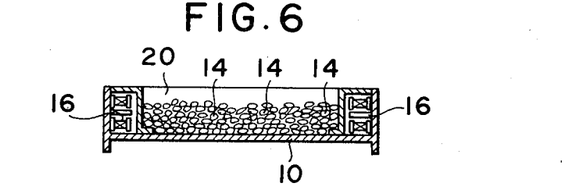
Figure 7:
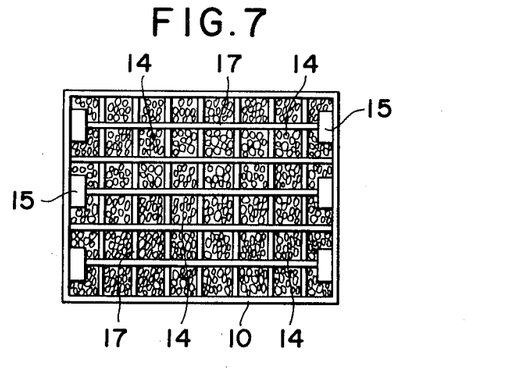
FIG. 7 is a diagrammatic plan view of a further modification of the first embodiment.

FIGS. 2 and 3 show modifications of the casing 10 for retaining particulate objects of magnetic material. In FIG. 2, the casing 10 is formed with openings 12' in the side walls thereof. In FIG. 3, the screen 11 of FIG. 1 is replaced by a plate formed with openings 12" therein which connect the space occupied by the particulate objects with the fluid passage 12. In the modification of FIG. 4, the particulate objects are constituted in part by those of permanent magnet material 13 and in part by those 14 of a magnetizable material. In this case, the latter 14 are magnetized by the magnetic fluxes produced by the permanent magnet particles 13 to provide the desired magnetic attraction forces in their own regions. As shown in FIGS. 5 and 6, the entire portion of particulate objects may also be constituted by those 14 of a magnetizable material. In this case, permanent magnets 15 or electromagnets 16 are provided and may be arranged as shown in the casing 10. The magnetizable material may be iron, nickel, cobalt, a ferrite, an iron-chromium-cobalt alloy, an iron-silicon-aluminum alloy (sendust) or an iron-nickel alloy (permalloy). In a modification of FIG. 7, partition plates 17 are used to divide the interior of the casing 10 into a plurality of box spaces in which the particulate objects 13 or 14 or 13 and 14 are retained. This arrangement ensures a uniform distribution of the particulate objects placed under the influence of an external magnetic field. A portion of the particulate objects may be composed of an elastic material, e.g. a synthetic or natural rubber or resin.

In the embodiment of FIG. 8, the rugged layer 20 of magnetic material according to the invention is provided by a layer of spherical particles 21 retained upon a support member 22 composed of an elastic material, e.g. a synthetic or natural rubber or resin, having permanent magnet particles 23 uniformly distributed therein. The spherical particles 21 and the particles 23 may be composed of an aluminum-nickel-cobalt alloy, a rare-earth material (e.g. samarium cobalt), a ferrite (e.g. barium ferrite or strontium ferrite), an iron-chromium-cobalt alloy or a manganese-aluminum alloy. The spherical particles 21 should preferably be of a diameter of 2 to 10 mm. The particles 23 contained in the elastic material 22 may be of a particle size ranging between 1 microns and 10 mm and should preferably be smaller than the spherical particles 21. Because of magnetic attraction with the particles 23, the spherical particles 21 are retained firmly upon the elastic member 22. The layer of these particles 21 defines a rugged solid surface layer for impingement by the waste cutting liquid falling from the cutting zone 6 and causes the impinging droplets and streams of the liquid to irregularly deflect and reflect so as to counteract their kinetic energy. As a result, practically splashless and laminar flows of the waste cutting liquid are created along the surfaces of the spherical particles 21 and allowed to percolate by gravity through the interstices thereof and with the support member 22, down to the floor of the receptacle and are eventually discharged smoothly through the outlet duct 9. In addition, the ferromagnetic machining products entrained in the waste cutting liquid are magnetically trapped upon the surface and at interstices of the spherical particles 21 with the support member 22. Since the waste cutting liquid is led in this manner to smoothly flow in a thin layer on the impinged surface, practically without causing splashes thereof, full protection of the environment against detrimental pollution and contamination by the waste cutting liquid is assured. The elasticity or flexibility of the support member 22 supporting the particulate objects 21 effectively absorbs the impact force of the liquid droplets and streams impinging upon the latter.

Figure 9:
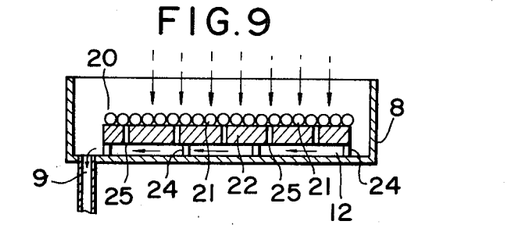
FIGS. 9 through 12 are diagrammatic sectional views of modifications of the second embodiment.
Figure 10:
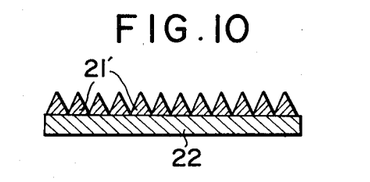
Figure 11:
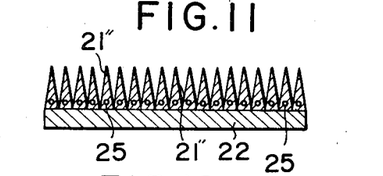
Figure 12:
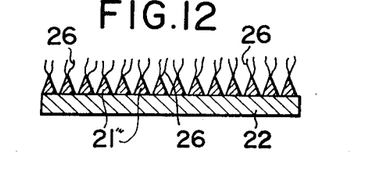

FIGS. 9 through 12 show modifications of the embodiment of FIG. 8. Thus, FIG. 9 shows that the support member 22 may be supported on legs 24 to provide a fluid passage 12 between it and the floor of the receptacle 8 and may be formed with openings to communicate the interstices of the particulate objects 21 with the fluid passage 12. In FIG. 10, the particulate objects 21 are shown to be individually conical or pyramidal in shape 21'. In FIG. 11, the particulate objects 21" individually have an elongated conical or pyramidal shape. In FIG. 12, the conical or pyramidal particulate objects 21''' have strings 26 formed on their apexes. The spherical, conical or pyramidal particulate objects 21, 21', 21'', and 22''' may be composed of a rubber or resin having therein fine permanent-magnet or magnetizable particles uniformly distributed. Shown at 25 in the modification of FIG. 11 are permanent magnets each contained in each conical or pyramidal particle 25 in the region of its base in contact with the support member 22.

Figure 14:
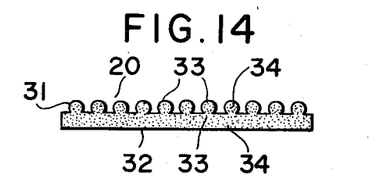
FIGS. 14 through 18 are diagrammatic sectional views of modifications of the third embodiment.
Figure 15:
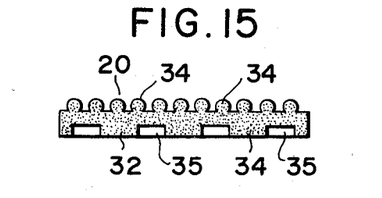
Figure 16:
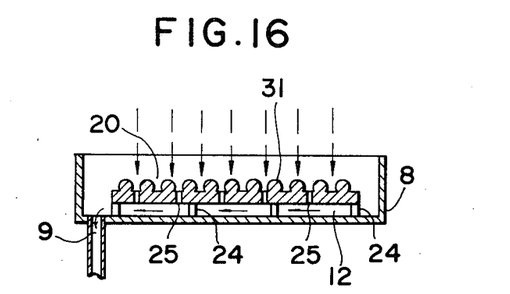

In the embodiment of FIG. 13, the rugged layer 20 of magnetic material is provided by a multiplicity of spherical projections 31 raised from a homogeneous flexible member 32 composed of a rubber or resin having finely divided magnetic particles 33. These particles are composed of a permanent magnet material, e.g. an aluminum-nickel-cobalt alloy, a rare-earth material (e.g. samarium cobalt), a ferrite (e.g. barium ferrite or strontium ferrite) an iron-chromium-cobalt alloy or a manganese-aluminum alloy. The spherical projections should preferably be of a size between 2 and 10 mm. The finely divided particles may be of a particle size ranging between 1 micron and 10 mm. FIG. 14 shows a modification wherein the magnetic particles are composed in part of a permanent-magnet material 33 and in part of a magnetizable material 34, e.g. iron, nickel, cobalt, a ferrite, an iron-chromium-cobalt alloy, a iron-silicon-aluminum alloy or an iron-nickel alloy. FIG. 15 shows a structure in which magnetizable particles 34 are magnetized by a plurality of permanent magnets 35 which may be replaced by electro-magnet coil means. FIG. 16 shows that the member 32 may be supported on legs 24 to provide a fluid passage 12 between it and the floor of the receptacle 8 and may be formed with openings 25 which connect the region of projections 31 or the rugged layer 20 with the fluid passage 12.

Figure 17:
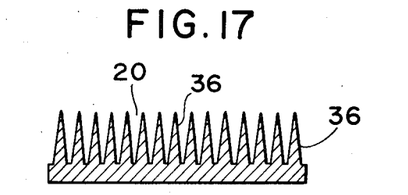
Figure 18:
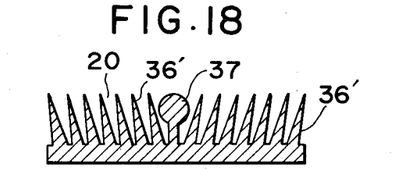
Figure 19:
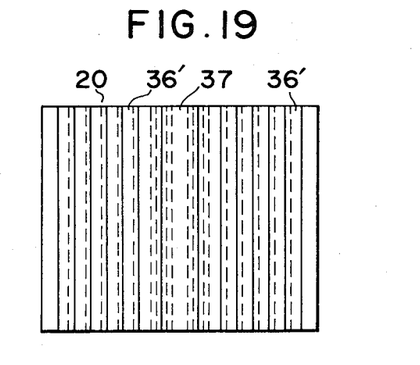
FIG. 19 is a diagrammatic plan view of the modification of FIG. 18.

The modification of FIG. 17 makes use of a plurality of parallel ridges 36 forming the rugged layer of magnetic material having the function previously described. As shown at 36' in FIGS. 18 and 19, these ridges may have an inclination outwards or towards at least a pair of opposed horizontal ends of the body to concentrate reflection of the falling liquid droplets or streams inwardly.

There is thus provided, in accordance with the present invention, a new and useful apparatus for controlling splashes and purification, of a machining liquid.

What is claimed is:

1. A machine tool wherein a machining liquid is supplied to a machining zone defined between a tool and a workpiece and thence, while entraining ferromagnetic machining products therein, is allowed to fall freely from said machining zone at least in part by gravity, said machine tool comprising:
   a receptacle disposed at least in major part below said machining zone directly across an air space for temporarily impounding in said receptacle said machining liquid falling freely from said machining zone across said air space; and
   a liquid collecting member disposed in said receptacle and comprising a rugged layer of magnetic material which is disposed below said machining zone so as to be impinged upon by said freely falling machining liquid whereby the tendency thereof to splash is dissipated by energy absorption while said ferromagnetic machining products therein are captured on said layer.

2. The machine tool defined in claim 1 wherein said rugged layer comprises at least one layer of particulate objects of magnetic material.

3. The machine tool defined in claim 2, further comprising a casing for retaining said particulate objects of magnetic material therein.

4. The machine tool defined in claim 3 wherein said casing is formed in a side wall portion thereof, with at least one opening for allowing the machining liquid collected in said casing to flow to a floor of said receptacle.

5. The machine tool defined in claim 3 wherein said casing is formed in a bottom wall portion thereof with at least one opening for allowing the machining liquid collected in said casing to flow to a floor of said receptacle.

6. The machine tool defined in claim 3 wherein said casing comprises a screen of mesh smaller than said particulate objects for defining a bottom wall portion of said casing and a frame member for constituting a side wall portion of said casing.

7. The machine tool defined in claim 2 wherein said particulate objects are composed of a permanent magnet material.

8. The machine tool defined in claim 2 wherein a portion of said particulate objects are composed of a permanent magnet material and the remainder are composed of a magnetizable material and adapted to be magnetized by the magnetic field produced at least in part by said permanent magnet particulate objects.

9. The machine tool defined in claim 7 or claim 8 wherein said permanent magnet material includes a substance selected from the group which consists of aluminum-nickel-cobalt alloys, barium ferrite, strontium ferrite, samarium cobalt, aluminum-manganese alloys and iron-chromium-cobalt alloys.

10. The machine tool defined in claim 2 wherein at least a major part of said particulate objects are composed of a magnetizable material, further comprising external magnetic field means for magnetizing said magnetizable particulate objects.

11. The machine tool defined in claim 10 wherein said external magnetic field means comprises electromagnet coil means energizable by a power supply for exerting a magnetic field on said magnetizable particulate objects.

12. The machine tool defined in claim 10 wherein said external magnetic field means comprises an external permanent magnet for exerting a magnetic field on said magnetizable particulate objects.

13. The machine tool defined in claim 8 or claim 10 where said magnetizable material includes a substance selected from the group which consists of iron, nickel, cobalt, ferrites, iron-chromium-cobalt alloys, iron-silicon-aluminum alloys and iron-nickel alloys.

14. The machine tool defined in claim 2 wherein at least a major part of said particulate objects have a particle size ranging between 2 and 10 mm.

15. The machine tool defined in claim 2 wherein at least some of said particulate objects are individually spherical in shape.

16. The machine tool defined in claim 2, further comprising a support member for said particulate objects, said support member consisting of an elastic substance having magnetic particles distributed therein for holding said particulate objects by magnetic attraction.

17. The machine tool defined in claim 16 wherein said particulate objects are greater in size than said magnetic particles.

18. The machine tool defined in claim 17 wherein at least some of said particulate objects are individually spherical in shape.

19. The machine tool defined in claim 17 wherein at least some of said particulate objects individually have a conical shape with its base for attachment to said support member.

20. The machine tool defined in claim 17 wherein at least some of said particulate objects individually have a pyramidal shape with its base for attachment to said support member.

21. The machine tool defined in claim 17 wherein said magnetic particles are composed of a permanent magnet material.

22. The machine tool defined in claim 17 wherein said magnetic particles are composed in part of a permanent magnet material and in part of a magnetizable material and adapted to be magnetized by the magnetic field produced at least in part by said permanent magnet particles.

23. The machine tool defined in claim 21 or claim 22 wherein said permanent magnet material includes a substance selected from the group which consists of aluminum-nickel-cobalt alloys, barium ferrite, strontium ferrite, samarium cobalt, aluminum-manganese alloys and iron-chromium-cobalt alloys.

24. The machine tool defined in claim 17 wherein at least a major part of said magnetic particles are composed of a magnetizable material, further comprising external magnetic field means for magnetizing said magnetizable particles.

25. The machine tool defined in claim 24 wherein said external magnetic field means comprises electromagnet coil means energizable by a power supply for exerting a magnetic field to said magnetizable particles.

26. The machine tool defined in claim 24 wherein said external magnetic field means comprises an external permanent magnet for exerting a magnetic field on to said magnetizable particulate objects.

27. The machine tool defined in claim 22 or claim 24 wherein said magnetizable material includes a substance selected from the group which consists of iron, nickel, cobalt, ferrites, iron-chromium-cobalt alloys, iron-silicon-aluminum alloys and iron-nickel alloys.

28. The machine tool defined in claim 17 wherein said magnetic particles have a particle size ranging between 1 micron and 10 mm.

29. The machine tool defined in claim 1 wherein said rugged layer of magnetic material is constituted by a multiplicity of projections of a body consisting of an elastic substance having magnetic particles distributed therein.

30. The machine tool defined in claim 29 wherein said projections are greater in size than the magnetic particles.

31. The machine tool defined in claim 30 wherein at least some of said projections are individually spherical in shape.

32. The machine tool defined in claim 30 wherein said projection have a conical shape.

33. The machine tool defined in claim 30 wherein at least some of said projections are individually pyramidal in shape.

34. The machine tool defined in claim 30 wherein said projections are inclined outwardly or towards at least a pair of opposed horizontal ends of said body.

35. The machine tool defined in claim 30 wherein said magnetic particles are composed of a permanent magnet material.

36. The machine tool defined in claim 30 wherein said magnetic particles are composed in part of a permanent magnet material and in part of a magnetizable material and adapted to be magnetized by the magnetic flux produced at least in part by said permanent magnet particles.

37. The machine tool defined in claim 35 or claim 36 wherein said permanent magnet material includes a substance selected from the group which consists of aluminum-nickel-cobalt alloys, barium ferrite, strontium ferrite, samarium cobalt, aluminum-manganese alloys and iron-chromium-cobalt alloys.

38. The machine tool defined in claim 30 wherein at least a major part of said magnetic particles are composed of a magnetizable material, further comprising external magnetic field means for magnetizing said magnetizable particles.

39. The machine tool defined in claim 38 wherein said external magnetic field means comprises electromagnet coil means energizable by a power supply for exerting a magnetic field on said magnetizable particles.

40. The machine tool defined in claim 38 wherein said external magnetic field means comprises an external permanent magnet for exerting a magnetic field on said magnetizable particles.

41. The machine tool defined in claim 36 or claim 38 wherein said magnetizable material includes a substance selected from the group which consists of iron, nickel, cobalt, ferrites, iron-chromium-cobalt alloys, iron-silicon-aluminum alloys and iron-nickel alloys.

42. The machine tool defined in claim 30 wherein said magnetic particles have a particle size ranging between 1 micron and 10 mm.

* * * * *